US008254315B2

(12) United States Patent
Suzuki et al.

(10) Patent No.: US 8,254,315 B2
(45) Date of Patent: Aug. 28, 2012

(54) METHOD AND APPARATUS FOR RESEGMENTATION OF PACKET DATA FOR RETRANSMISSION ON HARQ TRANSMISSION FAILURE

(75) Inventors: Takashi Suzuki, Ichikawa (JP); James Womack, Bedford, TX (US); Gordon Peter Young, Shipston-on-Stour (GB)

(73) Assignee: Research in Motion Limited, Waterloo, Ontario (CA)

( * ) Notice: Subject to any disclaimer, the term of this patent is extended or adjusted under 35 U.S.C. 154(b) by 383 days.

(21) Appl. No.: 11/555,009

(22) Filed: Oct. 31, 2006

(65) Prior Publication Data

US 2008/0101312 A1    May 1, 2008

(51) Int. Cl.
*H04W 4/00* (2009.01)

(52) U.S. Cl. ........ 370/329; 370/328; 370/469; 370/473; 714/748

(58) Field of Classification Search .................... None
See application file for complete search history.

(56) References Cited

U.S. PATENT DOCUMENTS

| 2002/0021714 | A1* | 2/2002 | Seguin ............... 370/469 |
| 2002/0054578 | A1 | 5/2002 | Zhang et al. |
| 2007/0177630 | A1* | 8/2007 | Ranta et al. .......... 370/473 |
| 2008/0209297 | A1* | 8/2008 | Chandra et al. ....... 714/748 |
| 2008/0267190 | A1* | 10/2008 | Baker et al. .......... 370/394 |
| 2008/0298323 | A1* | 12/2008 | Yi et al. .............. 370/335 |

FOREIGN PATENT DOCUMENTS

| CN | 1711726 A | 12/2005 |
| EP | 1 487 161 A | 12/2004 |
| JP | 11-220459 | 8/1999 |
| JP | 2002-026991 | 1/2002 |
| JP | 2005-244668 | 9/2005 |
| JP | 2006-033156 | 2/2006 |
| JP | 2006-505999 | 2/2006 |
| WO | 2004/043017 A2 | 5/2004 |
| WO | 2004043017 | 5/2004 |
| WO | 2005125252 A1 | 12/2005 |

OTHER PUBLICATIONS

U.S. Appl. No. 60/741,143, filed Nov. 30, 2005.*
U.S. Appl. No. 60/729,286, filed Oct. 21, 2005.*
AU 2007221843, Examination Report dated Sep. 1, 2009.
Chinese patent application No. 200710181266.0, Office Action dated Apr. 29, 2010.
Japanese patent application No. JP2007-279642, Office Action dated Jun. 3, 2010.

* cited by examiner

*Primary Examiner* — Rafael Pérez-Gutiérrez
*Assistant Examiner* — Daniel Nobile
(74) *Attorney, Agent, or Firm* — Conley Rose, P.C.; J. Robert Brown, Jr.

(57) ABSTRACT

A method for packet data retransmission on Hybrid Automatic Repeat Request (HARQ) Transmission failure having the steps of: checking whether changes to HARQ transmission error performance characteristics are greater than a threshold and/or a deterioration of channel conditions is indicated or less than threshold; if yes, re-segmenting an RLC-SDU or RLC-PDU data into smaller PDU data sizes; and transmitting said re-segmented RLC-PDU data; and if not yes, transmitting previous RLC-PDU data.

18 Claims, 7 Drawing Sheets

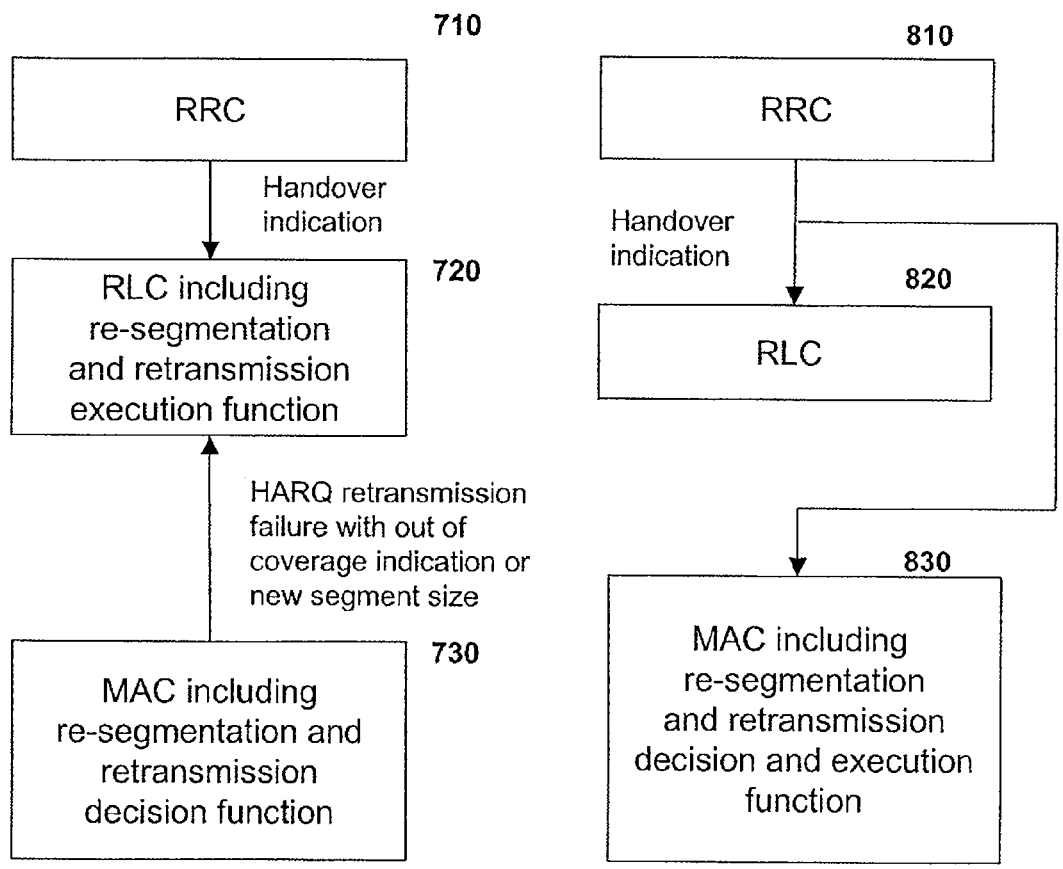

METHOD AND APPARATUS FOR RESEGMENTATION OF PACKET DATA FOR RETRANSMISSION ON HARQ TRANSMISSION FAILURE

FIELD OF THE DISCLOSURE

The present disclosure relates to the hybrid automatic repeat request (HARQ) scheme used in a media access control (MAC) layer data transmission, the radio link control (RLC) layer, and radio resource control (RRC) layer and in particular their interworking with respect to retransmission of data upon unsuccessful MAC protocol data unit reception.

BACKGROUND

In UMTS high speed download packet access (HSDPA) and enhanced dedicated uplink transport channel (E-DCH), collectively known as HSPA, use an HARQ scheme within the MAC layer to enhance the efficiency and reliability of data transmission between user equipment (UE) and the base station known as the Node B. This is, for example, defined in the 3GPP TS25.321 version 6.9.0 specification at sections 11.6 and 11.8. In HSDPA, the receiver side (UE) indicates the channel quality to the transmitter (Node B) using a 5 bit channel quality indicator (CQI) based on short term measurements of the pilot channel signal strength. These measurements can take approximately 2 ms.

Based on the reported CQI, the Node B will choose a transport block size and modulation and coding scheme (MCS) for the next transmission to the UE so that the transport block error probability should not exceed 10%.

Data is sent in the high-speed medium access control protocol data unit (MAC-hs PDU). When the UE receives the MAC-hs PDU, it computes a cyclic redundancy check (CRC) to determine correct reception. If the reception is successful, the UE sends an ACK to the Node B. If not, a NACK is sent. If the Node B receives a NACK, it retransmits the MAC-hs PDU again for Chase combining or the systematic and/or parity symbols for Incremental Redundancy if the number of retransmissions is within the specified maximum number as set by system operator. Incremental redundancy or a Chase Combining Scheme is used for the retransmission, as specified in 3GPP TS 25.212, version 6.9.0.

When the maximum number of HARQ retransmissions fail, as referred to herein as HARQ retransmission failure, retransmission of MAC-hs PDU is considered a failure. The acknowledged mode of operation of the radio link control (RLC), as defined in 3GPP TS25.322, version 6.8.0, sections 9.7 and 11.3, recovers the HARQ transmission error by retransmitting the RLC-PDUs originally multiplexed into the MAC-hs PDU which is indicated as not being received by the receiver side. This functionality is generally referred to as Automatic Repeat-reQuest or ARQ. This is based on the transmitter polling the receiver for the status of PDUs that it has or hasn't received and the receiver send this information back to the transmitter for processing. This two way signaling clearly adds a degree of additional latency in the transmission period of the incorrectly received data between the transmitter and the receiver.

In order to reduce this RLC level retransmission latency, the RLC can be notified of the HARQ retransmission failure and the RLC service data unit (RLC-SDU) or part of the RLC-SDU (the RLC-PDUs) can be retransmitted on the notification rather than waiting for a status report control message from the receiving side. An example of this type of enhancement is indicated in the RAN2 meeting number 55 contribution R2-062906 from NTT DoCoMo for the work item "Long-term evolution of UMTS Terrestrial Radio Access (UTRA) and Universal Terrestrial Radio Access Network (UTRAN)" (LTE). The result of 3GPP study on LTE is shown in the 3GPP TR25.912 version 7.0.0 specification. However, second or subsequent attempts may fail again due to the relatively long lasting bad radio conditions due to shadowing or other factors. In particular the size of the RLC-PDU that is re-transmitted is the same as the previous transmissions. In UMTS, the size of this RLC-PDU is determined during segmentation of the RLC-SDU as determined by the RRC configuration of RLC.

BRIEF DESCRIPTION OF THE DRAWINGS

The present application will be better understood with reference to the drawings in which:

FIG. 7 is a block diagram showing interaction between the RRC, RLC and MAC layers where retransmission and re-segmentation is executed in the MAC and RLC in accordance with the present system and method; and FIG. 8 is a block diagram showing an alternative interaction between the RRC, RLC and MAC layers where retransmission and re-segmentation is executed in the MAC.

DETAILED DESCRIPTION OF THE DRAWINGS

The present disclosure addresses the issue above for the improvement of retransmission latency further by re-segmenting data into more appropriate sizes according to radio channel conditions such as shadowing, among others. Further, the present disclosure addresses when the re-segmentation of data should occur.

The present application provides a method for packet data retransmission on Hybrid Automatic Repeat Request (HARQ) Transmission failure comprising the steps of: checking whether the changes to the HARQ transmission error performance characteristics are greater than a threshold and/or a deterioration of channel conditions is indicated or less than threshold; if yes, re-segmenting an RLC-SDU or RLC-PDU data into smaller PDU data sizes; and transmitting said re-segmented RLC-PDU data; and if not yes, transmitting previous RLC-PDU data.

The present application further provides a transmitter in a mobile network adapted to re-segment data into more appropriate sizes according to radio channel conditions comprising a re-segmentation layer, the re-segmentation layer adapted to: check whether the changes to the Hybrid Automatic Repeat Request (HARQ) transmission error performance characteristics are greater than a threshold and/or a deterioration of channel conditions is indicated or less than threshold; if yes, re-segment an RLC-SDU or RLC-PDU data into smaller PDU data sizes; and transmit said re-segmented RLC-PDU data; and if not yes, transmit previous RLC-PDU data.

Figure 1:
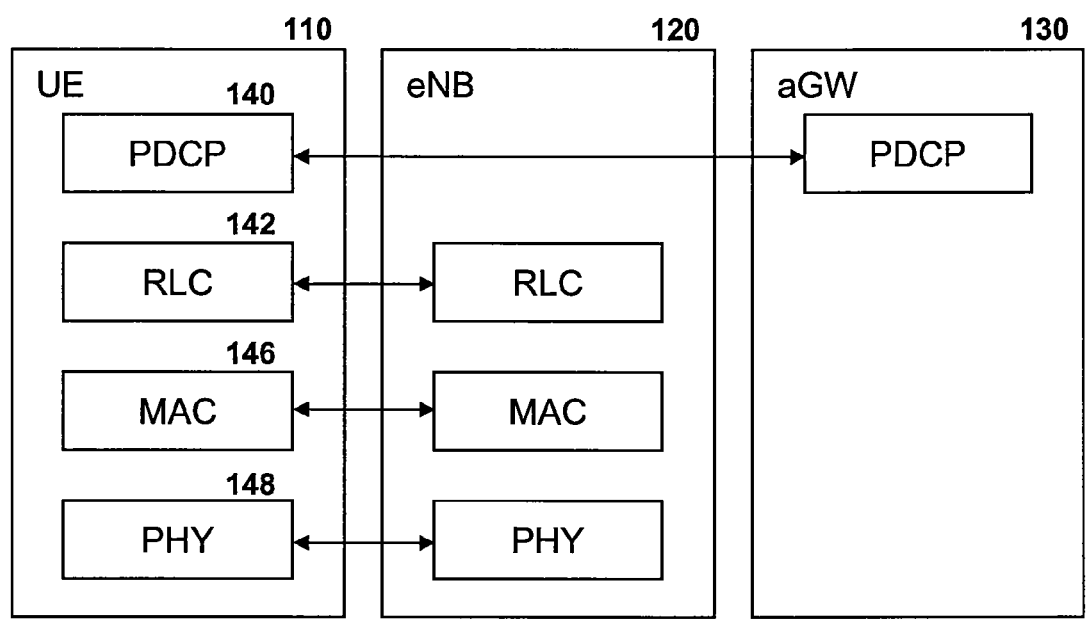
FIG. 1 is a block diagram showing a long-term evolution user plane protocol stack.

Reference is now made to the drawings. FIG. 1 shows a block diagram illustrating the long-term evolution (LTE) user plane protocol stack.

A UE 110 communicates with both an evolved Node B (eNB) 120 and an access gateway (aGW) 130.

Various layers are illustrated in the protocol stack. The packet data convergence protocol (PDCP) layer 140 is illustrated both on the UE 110 and on aGW 130. The PDCP layer 140 performs internet protocol (IP) header compression and decompression, transfer of user data and maintenance of sequence numbers (SN) for radio bearers.

Below PDCP layer 140 is the radio link control protocol layer 142, which communicates with the radio link control protocol layer 142 on the eNB 120. As will be appreciated, communication occurs through the physical layer in protocol stacks such as those illustrated in FIGS. 1 and 2. However, packets from the RLC layer 142 of the UE are interpreted by the RLC layer 142 on the eNB 120.

Below RLC layer 142 is the medium access control (MAC) data communication protocol layer 146. As will be appreciated by those skilled in the art, the RLC and MAC protocols form the data link sublayers of the UMTS and LTE radio interface and reside on the Node B (or eNB in LTE) and user equipment.

The layer 1 (L1) LTE (physical layer 148) is below the RLC/MAC layers 142 and 146. This layer is the physical layer for communications.

Figure 2:
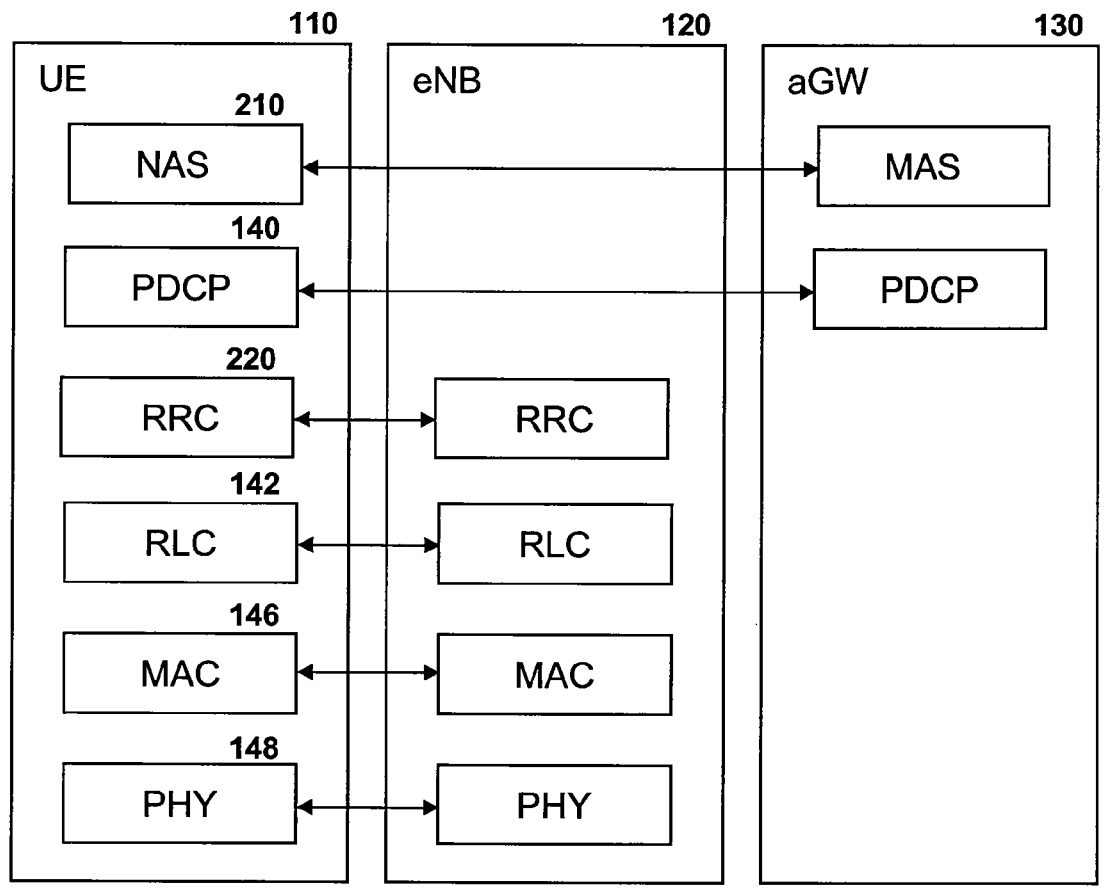
FIG. 2 is a block diagram showing a long-term evolution control plane protocol architecture.

Referring to FIG. 2, FIG. 2 illustrates the LTE control plane protocol architecture. Similar reference numerals to those used in FIG. 1 will be used in FIG. 2. Specifically, UE 110 communicates with eNB 120 and aGW 130. Further, physical layer 148, MAC layer 146, RLC layer 142 and PDCP layer 140 exist within FIG. 2.

FIG. 2 also shows the non-access stratum (NAS) layer 210. As will be appreciated, NAS layer 210 could include mobility management and session management.

The radio resource control protocol layer (RRC) 220, is the part of the protocol stack that is responsible for the assignment, configuration and release of radio resources between the UE and the E-UTRAN (Evolved universal terrestrial radio access network). The basic functionalities of RRC protocol for LTE is described in the 3GPP TR25.813 specifications.

As will be appreciated by those skilled in the art, in UMTS, automatic repeat request (ARQ) functionality is carried out within the RLC layer which resides in the radio network controller (RNC). Long Term Evolution (LTE) moves the ARQ functionality from the RNC to eNB where a tighter interaction may exist between the ARQ and the HARQ (within the MAC layer, also located in the eNB).

In HSDPA and E-DCH, an RLC SDU is segmented in a series of equally sized RLC PDUs (e.g. 42 octets) and given to the MAC layer for transmission over the air interface. The MAC usually multiplexes multiple RLC PDUs in to a MAC-PDU. If a MAC PDU cannot be delivered, after a certain number of tries the transmission of that MAC-PDU is abandoned. On the receiver side, the MAC layer de-multiplexes the received MAC-PDU in to multiple RLC-PDUs. If any missing RLC-PDUs are detected, the receiving side notifies the transmitting side using a STATUS message to request retransmission of the missing RLC PDUs. This is a relatively lengthy process.

In LTE, instead of abandoning the failed MAC level retransmission, resending after re-segmentation is currently being studied in order to greatly reduce latencies and increase data throughput. The issue is when and how to re-segment.

Figure 3:
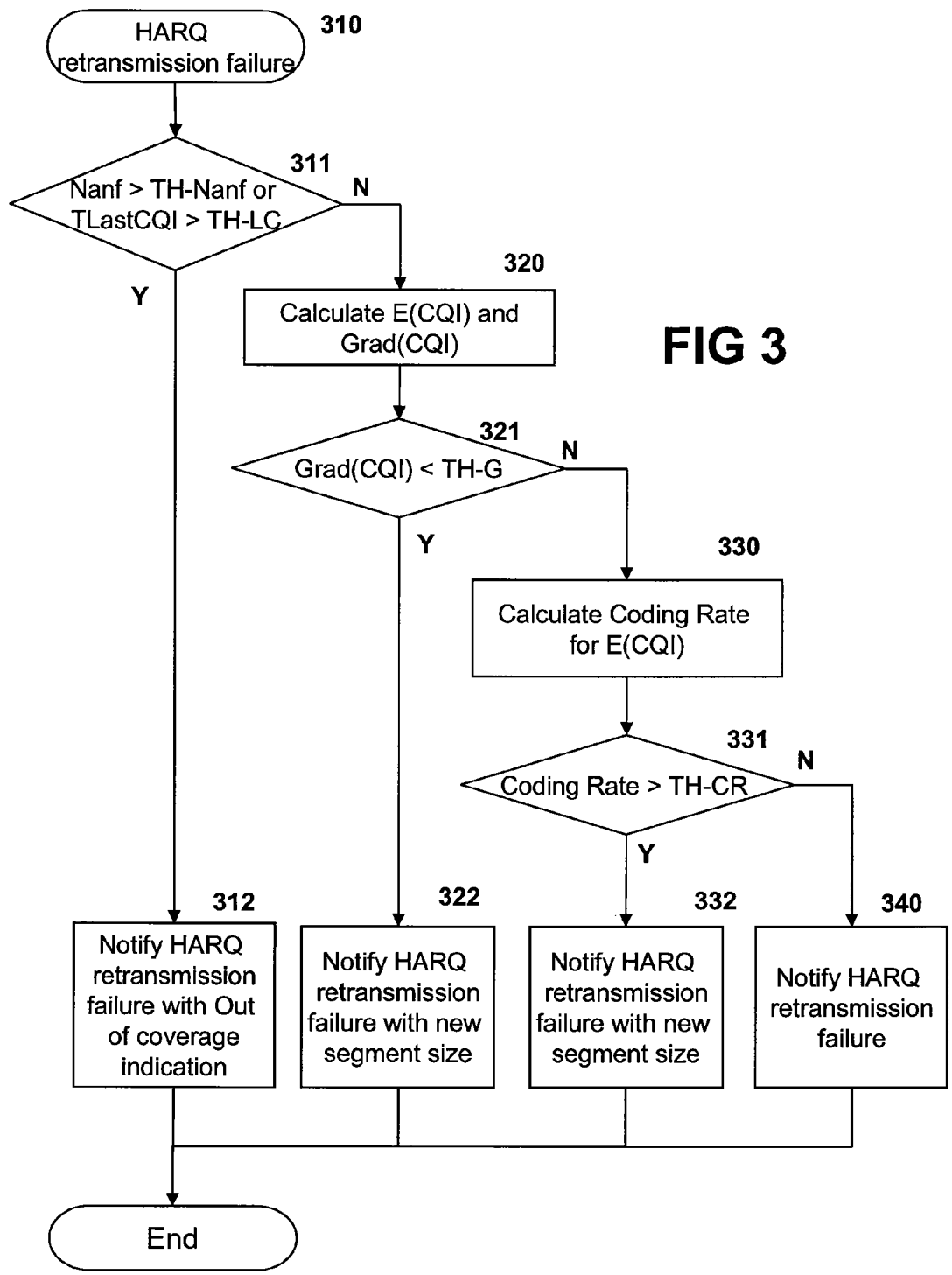
FIG. 3 is a flow chart showing a method for a retransmission and re-segmentation decision within MAC layer in accordance with the present disclosure.
Figure 4:
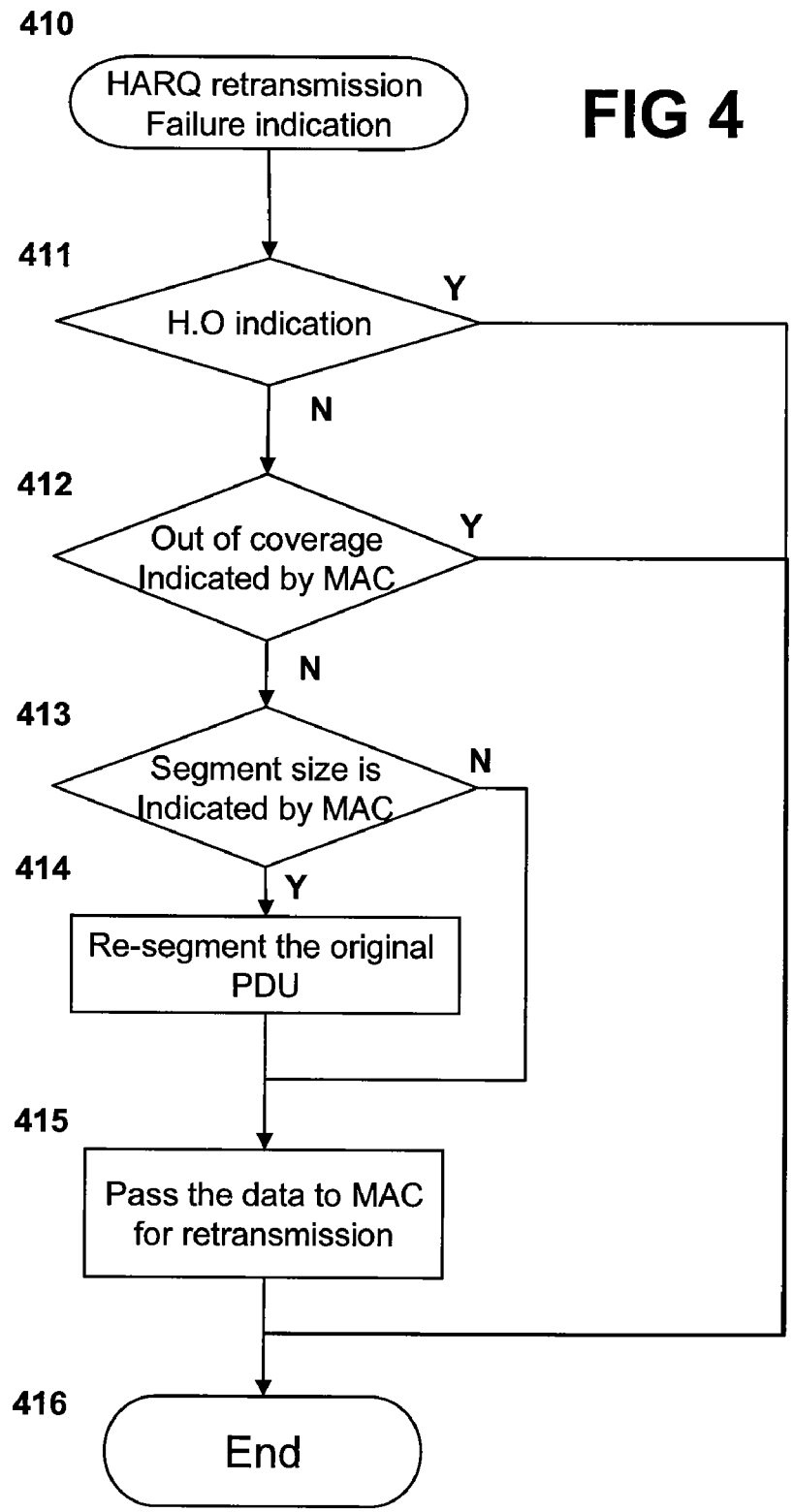
FIG. 4 is a flow chart showing a method for retransmission and re-segmentation execution according to the present disclosure and the decision made in the FIG. 3.

Referring to FIGS. 3 and 4, an overview of a method according to the present application is presented.

On HARQ retransmission failure, there are three choices in handling the error:

1) Do nothing—this means relying on the polling and status report functions of the ARQ function to recover the error. This option should be chosen when handover is expected or the receiver is considered to be out of radio coverage;

2) Re-segment and retransmit immediately—the failed data unit is re-segmented into a more appropriate size according to the current radio conditions before the retransmission. This option should be chosen when retransmitting the original transport block is not considered to be effective due to a deteriorated channel condition and/or decreased availability of radio resources.

3) Retransmit as is immediately. This option should be chosen when choices 1) and 2) are not applicable FIG. 3 shows an exemplary flowchart of how a choice is made within MAC layer on HARQ retransmission failure. The decision will be passed to the re-segmentation and retransmission execution function (RREF) with the notification of HARQ retransmission failure. The RREF performs retransmission and/or re-segmentation according to the informed decision and handover indication from an upper layer as shown in FIG. 4.

Figure 5:
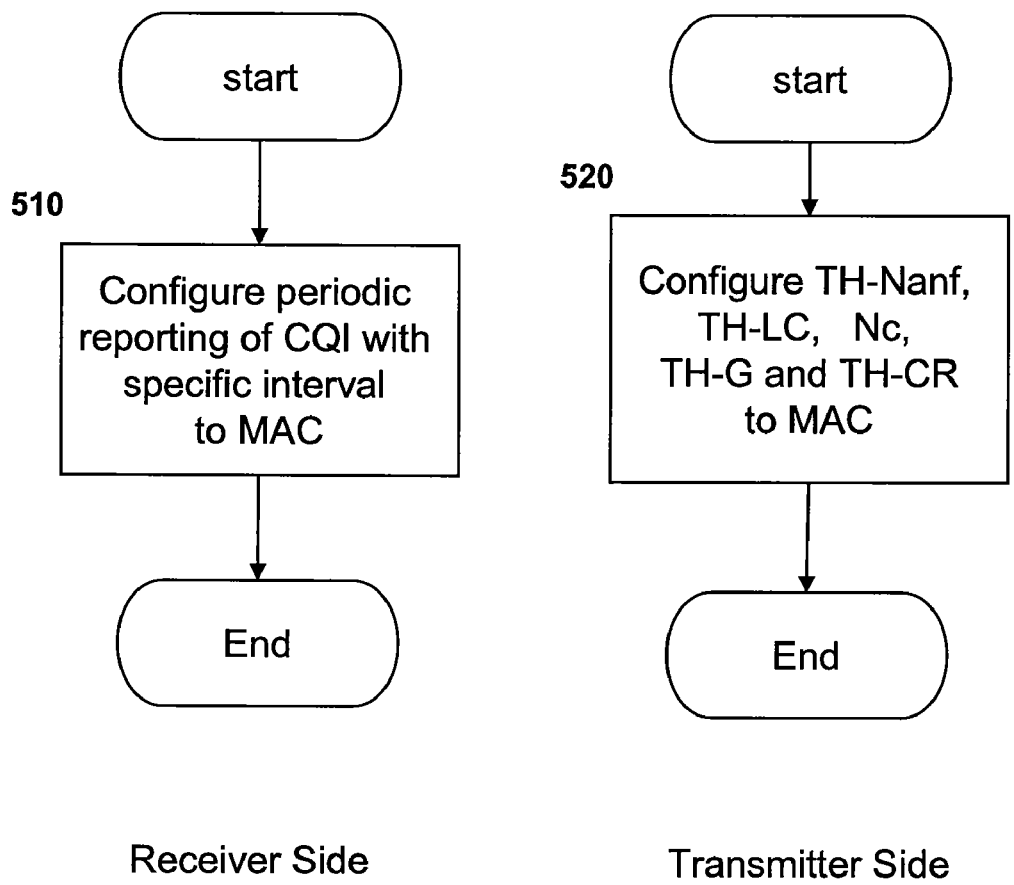
FIG. 5 is a flow chart illustrating the configuration of the MAC layer both at the receiver and transmitter sides.
Figure 6:
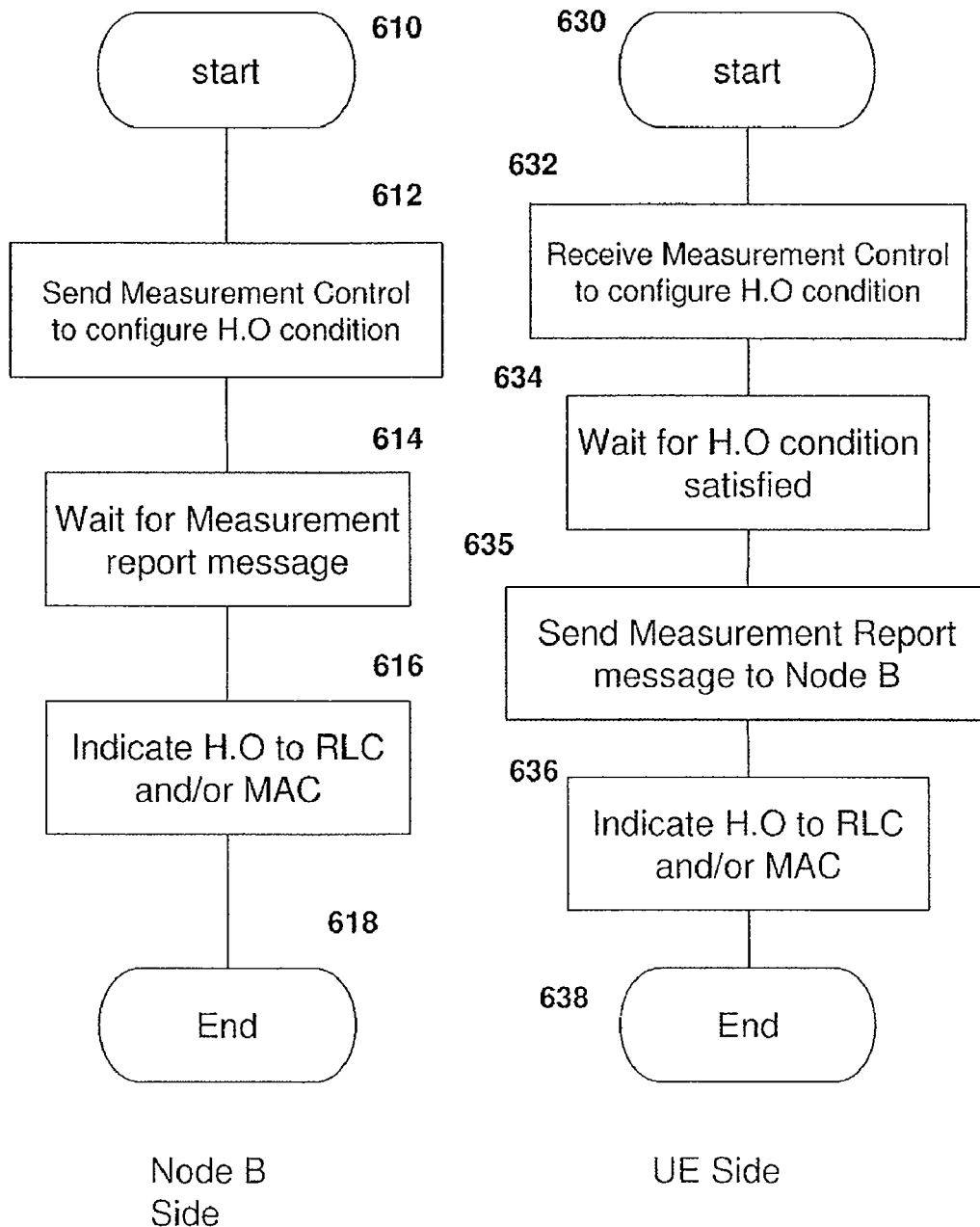
FIG. 6 is a block diagram showing a flow chart of the indication of a handover from both the Node B and the UE sides.

To make a choice in FIG. 3, certain threshold values need to be configured. Such parameter configurations, both at the receiver and transmitter sides, are shown in FIG. 5. FIG. 6 describes how the handover indication is provided to the RREF. FIG. 7 shows two possible protocol architectures, the first in which the RREF is included in the RLC and the second in which the RREF is included in MAC.

Referring to FIG. 3, details of the decision making process are explained. When an HARQ retransmission failure occurs (maximum retransmission number is reached) at step 310, an out-of-coverage condition is examined at step 311. For example, if the number of consecutive failures in the reception of ACK/NAK from the receiver (Nanf) (if the transmitter cannot detect expected ACK/NAK response at the time when the ACK/NAK should be received from the receiver), exceeds the configured threshold value (TH-Nanf), an out of coverage indication is passed to RREF at step 312.

Alternatively, if periodic CQI reporting from the receiver side is configured, the transmitter considers the receiver is out of radio coverage if the time between the most recent CQI report from the receiver and HARQ retransmission failure (TLastCQI) is longer than the configured threshold value (TH-LC), e.g. CQI interval * N, where N is an integer value. In such case out-of-coverage indication is passed to RREF at step 312.

Furthermore if the physical layer can indicate the receiver being out of coverage, then such indication can be delivered to RREF through the MAC layer.

If the receiver is considered to be in radio coverage, as determined at step 311, the average and gradient of most recently received CQI reports (designated E(CQI) and Grad (CQI), respectively) are calculated at step 320. The number of CQIs used for the calculation (Nc) can be configured, for example, by the RRC. If severe deterioration of channel quality is detected, i.e. Grad(CQI) is less than a configured threshold (TH-G), a new segmentation size such as half of original transport block size can be provided to RREF at step 322.

For a more accurate evaluation of channel quality, the coding rate can be calculated to check (step 330) if the original transport block size is still adequate. The derived rate is based on the assumption that the original transport block is retransmitted using the channel condition indicated by E(CQI) and using radio resources currently allocated to the receiver. If the calculated coding rate is more than a configured threshold value (step 331), e.g. 1, the original size is no longer considered appropriate. The new segment value can be calculated and passed to RREF at step 332. The new segment size value is chosen by a calculated coding rate which is considered to be appropriate, e.g. 0.5.

If the original transport block size is still adequate for the current channel condition, only HARQ retransmission failure is passed to the RREF at step 340. In this case, the RREF will retransmit the original data as-is, without re-segmentation.

Referring to FIG. 4, details of the RREF are described. The RREF can be in either the RLC layer or MAC layer. On notification of HARQ retransmission failure from MAC at step 410, the process at step 411 checks if handover is indicated. If so, no immediate retransmission is attempted because data can be lost during handover. Therefore it is better to delay the retransmission by letting ARQ retransmission procedures handle the case (i.e. polling and status reporting).

Similar to the handover case, if out of coverage is indicated, then no immediate retransmission is attempted at step 412.

If MAC indicates a new segment size at step 413 the original data is re-segmented into the specified size at step 414 and retransmitted at step 415. As will be appreciated, the last segment may not be the specified size and in such a case padding can be inserted if necessary.

If the MAC indicates no new segment size the original data is retransmitted as is at step 415. The process then ends at step 416.

Reference is now made to FIG. 5. FIG. 5 illustrates a flow chart for configuring threshold values for the decision made in FIG. 3. At the receiver side, the MAC layer is configured to report CQI with a specified interval to the transmitter at step 510. Alternatively, at the receiver side, the MAC layer is configured to report CQI with a specified interval to the transmitter if the CQI falls below a configured level at step 510. At the transmitter side, the values of thresholds, TH-LC, TH-Nanf, TH-G and TH-CR and the number of most recent CQI reports (Nc) are configured at the step 520. Values to be configured for the UE side can be configured by RRC or layer 2 signaling.

FIG. 6 illustrates the RRC indication to initiate handover for the eNB and the UE. It is currently assumed in LTE that only the eNB initiates handover.

The process for the network starts at step 610 and proceeds to step 612 in which it sends a measurement control message to configure the handover condition. The message can be a RRC message or Layer 2 level signaling.

The process then proceeds to step 614 in which it waits for a measurement report message. The message can be an RRC message or Layer 2 level signaling.

In step 616, the process indicates handover to the RLC and ends in step 618.

On the UE side, the process starts at step 630 and proceeds to step 632 in which it receives a measurement control message to configure a handover condition. The message can be an RRC message or Layer 2 level signaling.

The process then proceeds to step 634 in which it waits for a handover measurement condition to be satisfied. Once the handover measurement condition is satisfied, the process transmits measurement report message at step 635 and proceeds to step 636 in which it indicates the handover to the RLC and/or MAC [see FIGS. 7 and 8] and the process then ends at step 638. The measurement report can be a RRC message or Layer 2 signaling.

Reference is now made to FIG. 7. FIG. 7 depicts the interaction between the RRC, RLC and MAC layers in accordance with FIGS. 3 and 4. FIG. 7 shows the case where the RLC layer includes the functionality to determine whether re-segmentation should occur. FIG. 8, described below, indicates the situation where the MAC layer includes the functionality to determine whether re-segmentation should occur.

In FIG. 7 the RRC 710 provides RLC 720 with a handover indication. The RLC then applies the method of FIG. 3 in determining that re-segmentation should not occur.

The MAC layer 730 passes the HARQ retransmission failure and channel condition status information to the RLC which enables the RLC to determine if the re-segmentation should occur.

Referring to FIG. 8, FIG. 8 illustrates the MAC layer having the functionality for re-segmentation. In this case, the RRC 810 passes a handover indication to RLC 820. The handover indication is then passed from the RLC 820 to MAC layer 830. MAC layer already has HARQ retransmission failure information and can use the handover indication to perform the process of FIG. 3.

The above therefore addresses the issue of improving the retransmission latency further by re-segmenting data into more appropriate sizes according to radio channel conditions such as shadowing, among others. The method uses the channel condition indication based on the most recently received CQI, gradient, or coding rates of the most recently reported CQIs. The process re-segments the RLC-SDU or RLC-PDU into more appropriate PDU sizes and passes them to the MAC layer for retransmission.

By comparing the number of HARQ retransmission failures within a certain period against a configured threshold, the transmitter can determine an approximation for the channel condition. If there are a large number of HARQ retransmission failures when compared to the threshold this can reflect significant deterioration in the channel condition. This is reflected by the transmitter's continued inability to successfully transmit the data based on the original channel estimates (e.g. the received CQIs). If significant deterioration of channel quality is detected, a new segmentation size such as half of original transport block size can be notified to RREF.

The comparison to a threshold for the determined number of HARQ retransmission failures within a certain period and the handover indication can be used to decide if the retransmission is attempted again.

The RRC configures the MAC at the receiver side to report the CQI periodically or report the CQI periodically when CQI falls below a configured threshold. For the transmitter side it also signals TH-LC, Nc, TH-G and TH-CR to MAC. If the gradient CQI is less than TH-G re-segmentation is performed. If the coding rate for E(CQI) is greater than TH-CR, re-segmentation is performed. The size of the re-segmented PDU can depend on the coding rate.

This therefore improves the transmitter efficiency on HARQ retransmission failures by re-segmenting the PDU according to the channel condition and waiting for retransmission until the handover procedure is complete.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method for handling Hybrid Automatic Repeat Request (HARQ) retransmission failure, from a transmitter to a receiver, the method comprising the steps of:
   determining said HARQ retransmission failure by whether a maximum number of MAC protocol data units have not been received;
   upon said HARQ retransmission failure determining whether an out-of-coverage condition is indicated, wherein the out-of-coverage condition is determined:
      by checking whether a time between a channel quality indicator (CQI) was last received and the HARQ retransmission failure is longer than a threshold; or
      if a number of consecutive failures in reception of an acknowledgement, (ACK), or negative acknowledgement (NACK), from the receiver exceeds a configurable threshold value;
   if an out of coverage condition is determined, ending the retransmission process; and
   if an out of coverage condition is not determined,
      checking whether changes to HARQ data transmission error performance characteristics are greater than a threshold, and a deterioration of channel conditions is less than a threshold;
      if yes,
         resegmenting for retransmission Radio Link Control Protocol Data Units (RLC-PDU) data into smaller PDU data sizes; and
         transmitting said resegmented RLC-PDU data; and
      if not yes,
         retransmitting the previous RLC-PDU data.

2. The method of claim 1, wherein the method further comprises the step of, prior to the checking step, determining whether handover is indicated, and if yes, ending the retransmission.

3. The method of claim 2, wherein the handover is indicated by radio resource control protocol or layer 2 level signaling.

4. The method of claim 3, wherein the radio resource control protocol indicates if handover is expected when a measurement report or layer 2 level signaling is received or generated.

5. The method of claim 1, wherein the method is performed at a Radio Link Control (RLC) level of a transmitter.

6. The method of claim 1, wherein segmentation is performed at a medium access control (MAC) layer.

7. The method of claim 6, wherein a segment size is reported by the MAC layer to a RLC layer.

8. The method of claim 6, wherein an out-of-coverage condition is reported from the MAC layer to a RLC layer.

9. The method of claim 1, wherein the re-segmented data is passed from a RLC layer to a MAC layer.

10. The method of claim 1, wherein the HARQ checks the deterioration of channel conditions by determining if a gradient channel quality indicator is less than a gradient threshold.

11. The method of claim 10, wherein, if the gradient channel quality indicator is less than the gradient threshold, the method further comprising the steps of checking whether a coding rate for a last channel quality indicator or an average of most recently received CQIs and the availability of a radio resource for the receiver is greater than a threshold,
   if yes signaling HARQ retransmission failure with a new segment size;
   if no signaling HARQ retransmission failure.

12. A network element in a mobile network capable of re-segmenting data according to radio channel conditions based on Hybrid Automatic Repeat Request (HARQ) retransmission failure HARQ retransmission failure being determined by whether a maximum number of MAC protocol data unit receptions have failed, the network element comprising:
   a transmitter configured to determine whether an out-of-coverage condition is indicated, wherein the out-of-coverage condition is determined:
      by checking whether a time between a channel quality indicator, (CQI), was last received and the HARQ retransmission failure is longer than a threshold; or
      if the number of consecutive failures in reception of an acknowledgement (ACK), or negative acknowledgement (NACK), from the receiver exceeds a configurable threshold value;
   if an out of coverage condition is determined end the retransmission process; and
   if an out of coverage condition is not determined,
      check whether changes to the HARQ data transmission error performance characteristics are greater than a threshold, and a deterioration of channel conditions is a threshold;
      if yes,
         resegment for retransmission Radio Link Control layer Protocol Data Units (RLC-PDU) data into smaller PDU data sizes; and
         transmit said resegmented RLC-PDU data; and
      if not yes, retransmitting the previous RLC-PDU data.

13. The network element of claim 12, wherein the transmitter is adapted to re-segment at a RLC layer or a MAC layer.

14. The network element of claim 12, wherein the transmitter is further adapted to determine whether handover is indicated, and if yes, end the retransmission.

15. The network element of claim 14, wherein the handover is indicated by a radio resource control protocol or layer 2 level signaling.

16. The network element of claim 15, wherein the radio resource control protocol indicates if handover is expected when a measurement report or layer 2 level signaling is received or generated.

17. The network element of claim 12, wherein the transmitter is adapted to check the deterioration of channel conditions by determining if a gradient channel quality indicator is less than a gradient threshold.

18. The network element of claim 17, wherein if the gradient channel quality indicator is less than the gradient threshold, the transmitter is adapted to check whether a coding rate for a last channel quality indicator is greater than a coding rate threshold,
   if yes, signal HARQ retransmission failure with a new segment size;
   if no signal HARQ retransmission failure.

* * * * *

UNITED STATES PATENT AND TRADEMARK OFFICE
CERTIFICATE OF CORRECTION

PATENT NO. : 8,254,315 B2  
APPLICATION NO. : 11/555009  
DATED : August 28, 2012  
INVENTOR(S) : Takashi Suzuki et al.

It is certified that error appears in the above-identified patent and that said Letters Patent is hereby corrected as shown below:

Title Page, Item (73), Assignee replace "Research in Motion Limited" with
-- Research In Motion Limited --

Signed and Sealed this
Thirteenth Day of November, 2012

David J. Kappos
*Director of the United States Patent and Trademark Office*